US012750912B2

(12) United States Patent
Liu et al.

(10) Patent No.: US 12,750,912 B2
(45) Date of Patent: Sep. 29, 2026

(54) COMMUNICATION METHOD, COMMUNICATION APPARATUS, COMPUTER-READABLE STORAGE MEDIUM AND CHIP

(71) Applicant: HUAWEI TECHNOLOGIES CO., LTD., Shenzhen (CN)

(72) Inventors: Zhe Liu, Shanghai (CN); Chenghui Peng, Shanghai (CN); Jianjun Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 296 days.

(21) Appl. No.: 18/473,528

(22) Filed: Sep. 25, 2023

(65) Prior Publication Data

US 2024/0015837 A1 Jan. 11, 2024

Related U.S. Application Data

(63) Continuation of application No. PCT/CN2022/079606, filed on Mar. 7, 2022.

(30) Foreign Application Priority Data

Mar. 31, 2021 (CN) ......................... 202110349833.9

(51) Int. Cl.

| | |
|---|---|
| ***H04W 76/27*** | (2018.01) |
| ***H04W 8/08*** | (2009.01) |
| ***H04W 24/02*** | (2009.01) |

(52) U.S. Cl.

CPC ............ *H04W 76/27* (2018.02); *H04W 8/08* (2013.01); *H04W 24/02* (2013.01)

(58) Field of Classification Search

CPC ........ H04W 76/27; H04W 8/08; H04W 24/02

See application file for complete search history.

(56) References Cited

U.S. PATENT DOCUMENTS

| | | | | |
|---|---|---|---|---|
| 2012/0294213 | A1 | 11/2012 | Chen et al. | |
| 2014/0112236 | A1* | 4/2014 | Jung .................. | H04W 36/302 370/312 |
| 2020/0314664 | A1* | 10/2020 | Zhou ..................... | H04W 16/28 |

FOREIGN PATENT DOCUMENTS

| | | | |
|---|---|---|---|
| CN | 104067553 | A | 9/2014 |
| CN | 106412944 | A | 2/2017 |

(Continued)

OTHER PUBLICATIONS

European Search Report issued in corresponding European Application No. 22778481.6, dated Oct. 8, 2024, pp. 1-7.

(Continued)

*Primary Examiner* — Gbemileke J Onamuti

(74) *Attorney, Agent, or Firm* — HAUPTMAN HAM, LLP

(57) ABSTRACT

A terminal device sends suggestion information to a network device, where the suggestion information indicates a suggestion for activating or deactivating at least one secondary cell. The terminal device receives a configuration parameter for activating or deactivating the at least one secondary cell from the network device. The suggestion information may be included in an RRC message and includes timer duration information or adjustment amount information, or is included in a MAC CE and includes a state indicator for activating or deactivating a secondary cell, and further includes at least one of the following: effective time length information, probability information, target information, or reward information.

16 Claims, 4 Drawing Sheets

(56) References Cited

FOREIGN PATENT DOCUMENTS

| | | | |
|---|---|---|---|
| EP | 3565298 | A1 | 11/2019 |
| WO | 2015066875 | A1 | 5/2015 |

OTHER PUBLICATIONS

International Search Report issued in corresponding International Application No. PCT/CN2022/079606, dated Apr. 28, 2022, pp. 1-10.

* cited by examiner

COMMUNICATION METHOD, COMMUNICATION APPARATUS, COMPUTER-READABLE STORAGE MEDIUM AND CHIP

CROSS-REFERENCE TO RELATED APPLICATIONS

This application is a continuation of International Application No. PCT/CN2022/079606, filed on Mar. 7, 2022, which claims priority to Chinese Patent Application No.202110349833.9, filed on Mar. 31, 2021. The disclosures of the aforementioned applications are hereby incorporated by reference in their entireties.

BACKGROUND

To provide a peak rate of single user equipment and a system capacity improvement, a transmission bandwidth increase technology, that is, carrier aggregation (CA), is introduced. In a carrier aggregation technology, a plurality of component carriers (CC) are aggregated, so that a bandwidth that is used by the user equipment is a sum of bandwidths of the plurality of carriers, and the peak rate is almost proportionally increased. Each CC corresponds to an independent cell, and is classified into a primary cell (PCell) and a secondary cell (SCell) in a CA scenario. For user equipment, in response to the carrier aggregation not existing, the user equipment has only one serving cell, that is, the primary cell. In response to the carrier aggregation existing, the serving cell of the user equipment is a set of the primary cell and the secondary cell, for example, includes one primary cell and one or more secondary cells.

The secondary cell is in an activated or deactivated state, but how to implement activation or deactivation of the secondary cell is a problem worth considering.

SUMMARY

Example embodiments described herein provide solutions for configuring activation or deactivation of a secondary cell in a communication system.

According to a first aspect, a communication method is provided. The communication method includes: A terminal device sends suggestion information to a network device, where the suggestion information indicates a suggestion of the terminal device for activating or deactivating at least one secondary cell. The terminal device receives, from the network device, a configuration parameter for activating or deactivating the at least one secondary cell. The network device is an access network device.

In this way, the terminal device provides the suggestion information to the network device, so that the network device refers to the suggestion information to determine to activate or deactivate the at least one secondary cell, the information considered is more comprehensive, and determining of activation or deactivation of the secondary cell is more accurate, thereby better implementing optimized utilization of resources.

In some embodiments of the first aspect, the sending, by a terminal device, suggestion information to a network device includes: The terminal device sends an RRC message to the network device, where the RRC message includes the suggestion information, and the RRC message is one of the following messages: an RRC connection resume complete message, an RRC setup complete message, an RRC reconfiguration complete message, or an RRC recommendation message. In this way, in at least one embodiment, the suggestion information is transmitted by using the RRC message, so that an existing RRC format is fully utilized, and the network device accurately obtains the suggestion information in a timely manner.

In some embodiments of the first aspect, the suggestion information includes: timer duration information or timer adjustment amount information of a deactivation timer of the at least one secondary cell. In this way, the terminal device provides the suggestion for the deactivation timer to the network device by using the suggestion information, so that the network device refers to the suggestion to determine the configuration parameter of the deactivation timer of the at least one secondary cell.

In some embodiments of the first aspect, the sending, by a terminal device, suggestion information to a network device includes: The terminal device sends a media access control (MAC) control element (CE) to the network device, where the MAC CE includes suggestion information for activating or deactivating at least one secondary cell. In this way, the terminal device explicitly indicates a suggestion for activating or deactivating the at least one secondary cell by using the MAC CE, so that the network device meets a usage parameter of the terminal device in a more timely and intuitive manner.

In some embodiments of the first aspect, the suggestion information further includes at least one of the following: effective time length information, probability information, target information, or reward information. In this way, the terminal device further provides more abundant reference information to the network device, so that the network device refers to the reference information to determine activation or deactivation of the at least one secondary cell, and the network device makes a decision based on more comprehensive factors, thereby improving accuracy of the decision, and further implementing the rational allocation of resources.

According to a second aspect, a communication method is provided. The communication method includes: A network device receives suggestion information from a terminal device, where the suggestion information indicates a suggestion of the terminal device for activating or deactivating at least one secondary cell. The network device determines, based on the suggestion information, a configuration parameter for activating or deactivating the at least one secondary cell. The network device sends the configuration parameter to the terminal device.

In this way, the network device receives the suggestion information for activating or deactivating the at least one secondary cell by the terminal device, and determine, based on the suggestion information, the configuration parameter for activating or deactivating the at least one secondary cell. In this solution, information considered by the network device during configuration is more comprehensive, and determining activation or deactivation of the secondary cell is more accurate, thereby better helping to implement optimized utilization of resources.

In some embodiments of the second aspect, the receiving, by a network device, suggestion information from a terminal device includes: The network device receives a radio resource control (RRC) message from the terminal device, where the RRC message includes the suggestion information, and the RRC message is one of the following messages: an RRC connection resume complete message, an RRC setup complete message, an RRC reconfiguration complete message, or an RRC recommendation message. In this way, in at least one embodiment, the suggestion information is transmitted by using the RRC message, so that an existing RRC format is fully utilized, and the network device accurately obtains the suggestion information in a timely manner.

In some embodiments of the second aspect, suggestion information includes: timer duration information or timer adjustment amount information of a deactivation timer of the at least one secondary cell. In this way, the network device learns of a suggestion of the terminal device for the deactivation timer by using the suggestion information, and then the network device refers to the suggestion to determine a configuration parameter of the deactivation timer of the at least one secondary cell.

In some embodiments of the second aspect, the receiving, by a network device, suggestion information from a terminal device includes: The network device receives a media access control (MAC) control element (CE) from the terminal device, where the MAC CE includes the suggestion information for activating or deactivating the at least one secondary cell. In this way, the network device explicitly learns, by using the MAC CE, the suggestion of the terminal device for activating or deactivating the at least one secondary cell, so that the network device meets a usage parameter of the terminal device in a more timely and intuitive manner.

In some embodiments of the second aspect, the determining, by the network device, a configuration parameter includes: The network device determines the configuration parameter based on the suggestion information and a load state of the network device. In this way, the network device comprehensively considers factors of the terminal device and factors of the network device to determine the configuration parameter, and the factors considered are more comprehensive, so that the determined configuration parameter is more accurate.

In some embodiments of the second aspect, the suggestion information further includes at least one of the following: effective time length information, probability information, target information, or reward information. In this way, the network device learns more abundant reference information of the terminal device about the suggestion information, so that the network device refer to the reference information to determine activation or deactivation of the at least one secondary cell, and the network device makes a decision based on more comprehensive factors, thereby improving accuracy of the decision, and further implementing the rational allocation of resources.

According to a third aspect, a communication apparatus is provided. The communication apparatus includes: a sending unit, configured to send suggestion information to a network device, where the suggestion information indicates a suggestion of a terminal device for activating or deactivating at least one secondary cell; and a receiving unit, configured to receive, from the network device, a configuration parameter for activating or deactivating the at least one secondary cell. The communication apparatus is implemented in the terminal device. For example, the communication apparatus includes the terminal device or include a chip in the terminal device.

In some embodiments of the third aspect, the sending unit is configured to: send a radio resource control (RRC) message to the network device, where the RRC message includes the suggestion information, and the RRC message is one of the following messages: an RRC connection resume complete message, an RRC setup complete message, an RRC reconfiguration complete message, or an RRC recommendation message.

In some embodiments of the third aspect, the suggestion information includes: timer duration information or timer adjustment amount information of a deactivation timer of the at least one secondary cell.

In some embodiments of the third aspect, the sending unit is configured to: send a medium access control (MAC) control element (CE) to the network device, where the MAC CE includes suggestion information for activating or deactivating at least one secondary cell.

In some embodiments of the third aspect, the suggestion information further includes at least one of the following: effective time length information, probability information, target information, or reward information.

According to a fourth aspect, a communication apparatus is provided. The communication apparatus includes: a receiving unit, configured to receive suggestion information from a terminal device, where the suggestion information indicates a suggestion of the terminal device for activating or deactivating at least one secondary cell; a determining unit, configured to determine, based on the suggestion information, a configuration parameter for activating or deactivating the at least one secondary cell; and a sending unit, configured to send the configuration parameter to the terminal device. The communication apparatus is implemented in the network device. For example, the communication apparatus includes the network device or include a chip in the network device.

In some embodiments of the fourth aspect, the receiving unit is configured to: receive a radio resource control (RRC) message from the terminal device, where the RRC message includes the suggestion information, and the RRC message is one of the following messages: an RRC connection resume complete message, an RRC setup complete message, an RRC reconfiguration complete message, or an RRC recommendation message.

In some embodiments of the fourth aspect, the suggestion information includes: timer duration information or timer adjustment amount information of a deactivation timer of the at least one secondary cell.

In some embodiments of the fourth aspect, the receiving unit is configured to: receive a media access control (MAC) control element (CE) from the terminal device, where the MAC CE includes the suggestion information for activating or deactivating the at least one secondary cell.

In some embodiments of the fourth aspect, the determining unit is configured to: determine the configuration parameter based on the suggestion information and a load state of the network device.

In some embodiments of the fourth aspect, the suggestion information further includes at least one of the following: effective time length information, probability information, target information, or reward information.

According to a fifth aspect, a terminal device is provided. The terminal device includes: at least one processor; and at least one memory, where the at least one memory is coupled to the at least one processor and stores instructions for execution by the at least one processor, the instructions, in response to being executed by the at least one processor, cause the terminal device to implement: sending suggestion information to a network device, where the suggestion information indicates a suggestion of the terminal device for activating or deactivating the at least one secondary cell; and receiving, from the network device, a configuration parameter for activating or deactivating the at least one secondary cell.

In some embodiments of the fifth aspect, in response to being executed by the at least one processor, instructions enable a terminal device to implement: sending a radio resource control (RRC) message to a network device, where the RRC message includes suggestion information, and the RRC message is one of the following messages: an RRC connection resume complete message, an RRC setup complete message, an RRC reconfiguration complete message, or an RRC recommendation message.

In some embodiments of the fifth aspect, the suggestion information includes: timer duration information or timer adjustment amount information of a deactivation timer of the at least one secondary cell.

In some embodiments of the fifth aspect, instructions, in response to being executed by the at least one processor, cause a terminal device to implement: sending a medium access control (MAC) control element (CE) to the network device, where the MAC CE includes the suggestion information for activating or deactivating the at least one secondary cell.

In some embodiments of the fifth aspect, the suggestion information further includes at least one of the following: effective time length information, probability information, target information, or reward information.

According to a sixth aspect, a network device is provided. The network device includes: at least one processor; and at least one memory, where the at least one memory is coupled to the at least one processor and stores instructions for execution by the at least one processor, the instructions, in response to being executed by the at least one processor, cause the network device to implement: receiving suggestion information from the terminal device, where the suggestion information indicates a suggestion of the terminal device for activating or deactivating the at least one secondary cell; determining, based on the suggestion information, a configuration parameter for activating or deactivating the at least one secondary cell; and sending the configuration parameter to the terminal device.

In some embodiments of the sixth aspect, instructions, in response to being executed by at least one processor, cause the network device to implement: receiving a radio resource control (RRC) message from the terminal device, where the RRC message includes the suggestion information, and the RRC message is one of the following messages: an RRC connection resume complete message, an RRC setup complete message, an RRC reconfiguration complete message, or an RRC recommendation message.

In some embodiments of the sixth aspect, the suggestion information includes: timer duration information or timer adjustment amount information of a deactivation timer of the at least one secondary cell.

In some embodiments of the sixth aspect, instructions, in response to being executed by at least one processor, cause the network device to implement: receiving a media access control MAC control element CE from the terminal device, where the MAC CE includes the suggestion information for activating or deactivating the at least one secondary cell.

In some embodiments of the sixth aspect, instructions, in response to being executed by at least one processor, cause the network device to implement: determining the configuration parameter based on the suggestion information and a load state of the network device.

In some embodiments of the sixth aspect, the suggestion information further includes at least one of the following: effective time length information, probability information, target information, or reward information.

According to a seventh aspect, a computer-readable storage medium is provided. The computer-readable storage medium stores a computer program, and in response to the computer program being executed by a processor, an operation of the communication method according to any embodiment of the first aspect or the second aspect is implemented.

According to an eighth aspect, a chip is provided. The chip is configured to perform an operation of the communication method according to any embodiment of the first aspect or the second aspect.

According to a ninth aspect, a computer program or a computer program product is provided. The computer program or computer program product is tangibly stored on the computer-readable medium and includes computer-executable instructions, and in response to being executed, the computer-executable instructions enable a device to implement an operation of the communication method according to any embodiment of the first aspect or the second aspect.

BRIEF DESCRIPTION OF DRAWINGS

Features, advantages, and other aspects of various implementations of at least one embodiment will become more apparent with reference to the accompanying drawings and the following detailed description. Several implementations of at least one embodiment are shown herein by way of example and not limitation. In the drawings.

DESCRIPTION OF EMBODIMENTS

Figure 1:
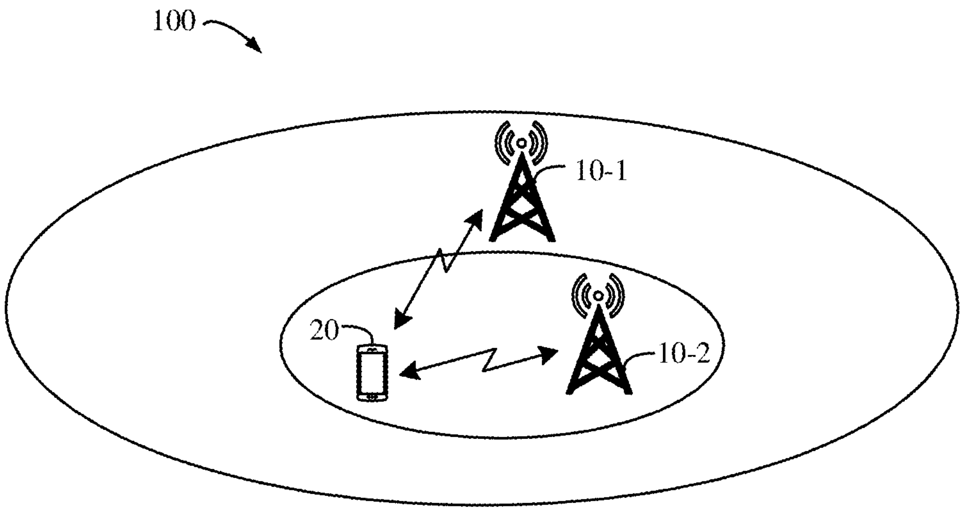
FIG. 1 is a schematic diagram of a communication environment 100 according to at least one embodiment.

The following describes at least one embodiment in more detail below with reference to the accompanying drawings. Although some embodiments are shown in the accompanying drawings, At least one embodiment is implemented in various forms and should not be construed as being limited to embodiments illustrated herein. On the contrary, these embodiments are provided for a more thorough and complete understanding of the embodiments described herein. The accompanying drawings and embodiments described herein are merely used as examples, but are not intended to limit the protection scope of at least one embodiment.

In the description of embodiments described herein, the term "including" and similar terms should be understood as an open inclusion, that is, "including but not limited to". The term "based on" should be understood as "based at least in part on". The term "one embodiment" or "the embodiment" should be understood as "at least one embodiment". The terms "first", "second", and the like refers to different or the same object. Other explicit and implicit definitions is also included below.

At least one embodiment is implemented according to any suitable communication protocol, including, but is not limited to, cellular communication protocol such as a 3rd generation (3G), a fourth generation (4G), a fifth generation (5G), a wireless local area network communication protocol such as institute of electrical and electronics engineers (IEEE) 802.11, and/or any other protocols currently known or developed in the future.

The technical solutions of at least one embodiment is applied to any suitable communication system, for example: a general packet radio service (GPRS), a global system for mobile communications (GSM), an enhanced data rate for GSM evolution (EDGE), a universal mobile telecommunications service (UMTS), a long term evolution (LTE) system, a wideband code division multiple access (WCDMA) system, a code division multiple access 2000 (CDMA2000) system, a time division-synchronization code division multiple access (TD-SCDMA) system, a frequency division duplex (FDD) system, time division duplex (TDD), a narrowband internet of things (NB-IoT) communication system, a fifth generation (5G) system or a new radio (NR) three application scenarios enhanced mobile broadband (eMBB), ultra-reliable and low-latency communication (URLLC), and enhanced machine type communication (eMTC).

The technical solutions in at least one embodiment relate to a network device, and the network device includes an access network device. The access network device is an apparatus that is deployed in a radio access network to provide a wireless communication function for a mobile terminal, and is, for example, a radio access network (RAN) network device. The access network device includes a base station, for example, a macro base station, a micro base station (also referred to as a small cell), a relay station, an access point, a remote radio unit (RRU), a radio head (RH), and a remote radio head (RRH) in various forms. In systems that use different radio access technologies, names of network devices is different. For example, in a long term evolution (LTE) system, a network device is referred to as evolved NodeB (eNB, or eNodeB), and is referred to as a node B (NB) in a 3G system, and is referred to as a g node B (gNB) or an NR node B (NR NB) in a 5G network. In some scenarios, the network device includes a central unit (CU) and a distributed unit (DU). The CU and DU is placed in different places. For example: The DU is deployed remotely in areas with heavy traffic, and the CU is deployed in a central equipment room. Alternatively, the CU and the DU is placed in a same equipment room. Alternatively, the CU and the DU is different components in one rack. For ease of description, in subsequent embodiments described herein, the foregoing apparatuses that provide a wireless communication function for a mobile terminal are collectively referred to as a network device, and the network device in at least one embodiment further refers to an access network device, which is not deliberately distinguished in the following.

The technical solutions of embodiments described herein relate to a mobile terminal. Optionally, the mobile terminal is also referred to as a mobile station (MS). The mobile terminal in at least one embodiment includes various handheld devices, in-vehicle devices, wearable devices, computing devices, or another processing device connected to a wireless modem that have a wireless communication function. The mobile terminal in at least one embodiment is also referred to as a terminal or user equipment (UE), and is a subscriber unit, a cellular phone (cellular phone or cellphone), a smart phone, a wireless data card, a personal digital assistant (PDA) computer, a tablet computer, a wireless modem, a handset device, a laptop computer, a machine type communication (MTC) terminal, or the like. The terminal device in at least one embodiment has an uplink service that is transmitted to the network device. In some cases, the terminal device further receives a downlink service from the network device. An uplink service volume of the terminal device is greater than or basically equal to a downlink service volume. For example, the terminal device is a terminal device performing a live broadcast service or a terminal device in a vertical industry.

FIG. 1 is a schematic diagram of a communication environment 100 according to at least one embodiment. As shown in FIG. 1, the communication environment 100 includes a network device 10-1, a network device 10-2, and a terminal device 20.

In some embodiments, the network device 10-1 and the network device 10-2 uses a carrier aggregation technology, to provide larger bandwidth for the terminal device 20. The network device 10-1 is an access network device of a primary cell of the terminal device 20, where the primary cell is also referred to as a primary carrier. The network device 10-2 is an access network device of a secondary cell of the terminal device 20, where the secondary cell is also referred to as a secondary carrier. Although FIG. 1 shows only one network device 10-2 as the access network device of the secondary cell, this is not limited in at least one embodiment. In various embodiments, a larger quantity of network devices 10-2 is used as access network devices of the secondary cell. For example, up to 32 secondary cells is included. For ease of description, the network device 10-1 and the network device 10-2 are collectively referred to as the network device 10 below.

A quantity of various devices and their connections shown in FIG. 1 are given for purposes of illustration and are not intended to be limited in any way. The communication environment 100 includes any suitable quantity of devices and networks suitable for implementing embodiments described herein.

To meet an increasing traffic usage of the terminal device, a bandwidth usage that the terminal device enjoys is also increasing. In one manner, a plurality of component carriers (CC) are aggregated, so that a bandwidth that is enjoyed by the terminal device is a sum of bandwidths of the plurality of carriers, and a peak rate of the terminal device is almost proportionally increased. Technically, mobile communication is able to use a large bandwidth, and use scattered spectrum in a wireless frequency band. In this case, there is one primary cell (PC) and at least one secondary cell (SCell) serving the terminal device. To make full use of various transmission resources and ensure communication quality and communication speeds of more terminal devices, duration in which the secondary cell provides a service for the terminal device is limited. Specifically, the network device of the secondary cell properly disconnects a communication connection between the terminal device and the network device of the secondary cell based on a downlink data transmission state, so as to deactivate a corresponding secondary cell. However, because the network device does not know an uplink service state of the terminal device, in response to the network device deactivating the secondary cell based on a downlink service state, an uplink service delay of the terminal device increases, and power consumption of the terminal device increases.

Example embodiments described herein are discussed in detail below with reference to the accompanying drawings. In the following description of an example method flow of FIG. 2, for ease of discussion, example embodiments described herein will be described with reference to the example communication environment of FIG. 1. Example embodiments described herein are applied to other similar communication environments.

Figure 2:
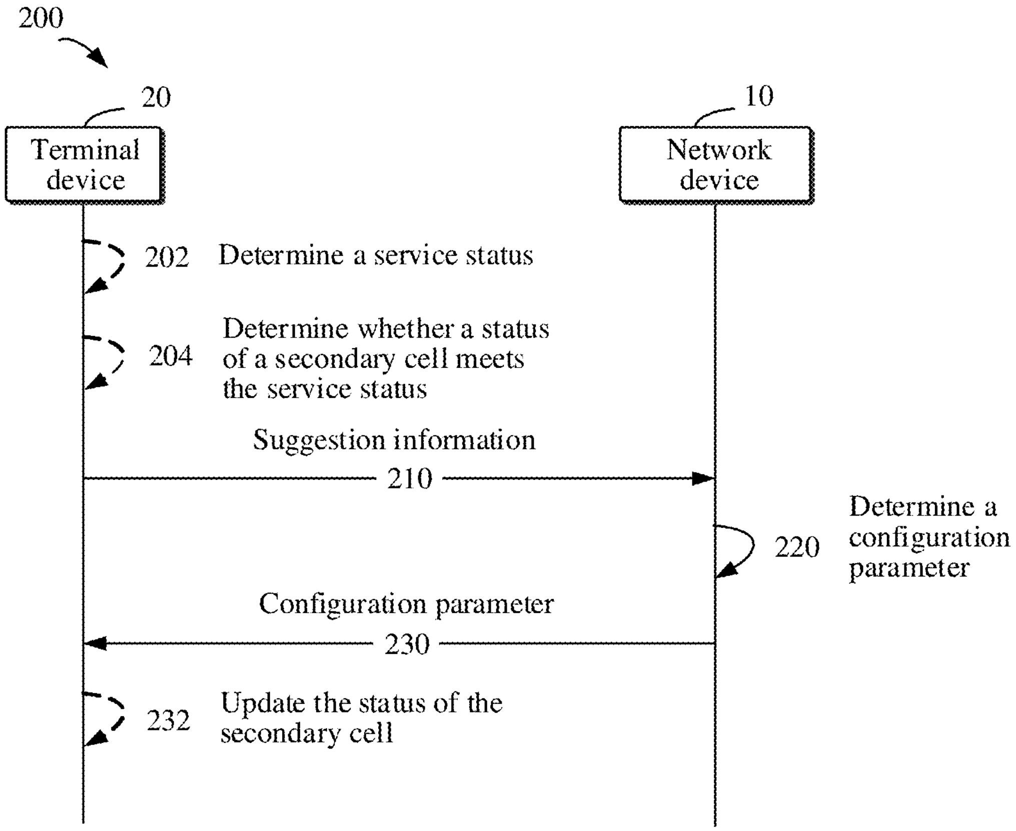
FIG. 2 is a schematic interaction diagram of a communication method 200 according to at least one embodiment.

FIG. 2 is a schematic interaction diagram of a communication method 200 according to at least one embodiment. FIG. 2 relates to a network device 10 and a terminal device 20. The network device 10 in FIG. 2 is the network device 10-1 or the network device 10-2 in FIG. 1. The network device 10-1 or the network device 10-2 is an access network device. For example, the network device 10 in FIG. 2 is an access network device of a primary cell, or is an access network device of a secondary cell. This is not limited in at least one embodiment. The communication process shown in FIG. 2 is merely used as an example and not for limitation. Embodiments described herein include interaction signaling that is not shown in FIG. 2, or some signaling shown in FIG. 2 is omitted.

As shown in FIG. 2, in some embodiments, the terminal device 20 sends 210 suggestion information to the network device 10. The suggestion information indicates a suggestion of the terminal device 20 for activating or deactivating at least one secondary cell.

In this way, the terminal device 20 provides the suggestion information to the network device 10, so that the network device 10 refers to the suggestion information to determine activation or deactivation of the at least one secondary cell, the information considered is more comprehensive, and determining of activation or deactivation of the secondary cell is more accurate, thereby better implementing optimized utilization of resources.

A serving cell of the terminal device 20 includes a primary cell and at least one secondary cell, and there is one or more secondary cells. The suggestion information in the solutions of the at least one embodiment is for some or all of the secondary cell. Although at least one embodiment uses one secondary cell as an example for description, a case of another secondary cell is similarly determined, and details are not described in at least one embodiment.

The suggestion information in at least one embodiment indicates, in an explicit manner, a suggestion for activating or deactivating at least one secondary cell, or the suggestion information in at least one embodiment indicates, in an implicit manner, a suggestion for activating or deactivating at least one secondary cell.

The suggestion information in at least one embodiment indicates a suggestion for activating at least one secondary cell, or indicate a suggestion for deactivating at least one secondary cell. Alternatively, in response to there being a plurality of secondary cells, the suggestion information in at least one embodiment indicates suggestions for activating some of the secondary cells in the plurality of secondary cells and also indicate suggestions for deactivating some other secondary cells in the plurality of secondary cells.

In an implementation, suggestion information indicates, in an implicit manner, a suggestion for activating or deactivating at least one secondary cell. For example, a timer is used to indicate that the secondary cell is activated in a timing process of the timer (the timer starts but does not expire), and the secondary cell is deactivated after the timer stops timing (the timer expires).

In this implementation, both the network device 10 and the terminal device 20 maintains a timer, and the timer is pre-configured by the network device 10.

For example, the network device 10 configures the timer based on factors such as a network resource of the network device 10 and a contention state of all terminal devices in a cell to which the network device 10 belongs. Optionally, the network device 10 completes the configuration in advance by using control signaling or in another manner. In response to the timer being configured, timer duration of the timer is synchronized between the network device 10 and the terminal device 20, which is also referred to as timeout duration, and is optionally represented as T0.

In response to there being a plurality of secondary cells in a scenario (for example, LTE), timer duration corresponding to the plurality of secondary cells are consistent, that is, timer duration on different secondary cells are all T0. In another scenario (for example, NR), timer duration corresponding to different secondary cells is different. For example, timer duration of the first secondary cell is T01, timer duration of the second secondary cell is T02, . . . , and the like. In a scenario such as NR, the terminal device 20 maintains a plurality of timers. For example, a quantity of timers is equal to or less than a quantity of secondary cells. To simplify description, a quantity of timers is not limited in the following implementations. A person skilled in the art obtains embodiments for a plurality of different timers, which shall fall within the protection scope of at least one embodiment.

There is a timer synchronized between the network device 10 and the terminal device 20. In response to the timer starting and not expiring, the corresponding secondary cell is in an activated state, and in response to the timer expiring, the corresponding secondary cell is deactivated. A timing manner of the timer is an ascending manner or a descending manner. For example, duration of the timer is T0. An interval from 0 to T0 is divided into T0 time units in a time dimension.

The descending manner is that, in response to the timer being started, an initial time $t=T0$ is set. Subsequently, in response to there being scheduling in a time unit and $t>0$, the timer is reset, that is, $t=T0$. In response to there being no scheduling in a time unit, the time of the timer is decreased, that is, $t=t-1$. In response to $t=0$ is reached, indicating that the timer expires. In this case, the network device 10 and the terminal device 20 deactivate a corresponding secondary cell.

The ascending manner is that, in response to the timer being started, an initial time $t=0$ is set. Subsequently, in response to there being scheduling in a time unit and $t<T0$, the timer is reset, that is, $t=0$. In response to there being no scheduling in a time unit, the time of the timer is increased, that is, $t=t+1$. In response to $t=T0$ is reached, indicating that the timer expires. In this case, the network device 10 and the terminal device 20 deactivate a corresponding secondary cell.

The terminal device 20 and the network device 10 separately perform timing on the timer, and that the timer does not expire corresponds to that the secondary cell is in the activated state. In at least one embodiment, timing is performed in the descending manner or the ascending manner before the timer expires. Details are not described in the following again.

The timer in this implementation is an uplink timer related to uplink transmission between the terminal device 20 and the network device 10.

In some embodiments, a timer is maintained between the network device 10 and the terminal device 20. Timeout duration of the timer is represented as T0. In an example, the timer is an uplink/downlink timer. In this case, after the timer is started and before the timer expires, the secondary cell is in the activated state, and uplink and downlink transmission is performed between the network device 10 and the terminal device 20. In another example, the timer is an uplink timer. In this case, after the timer is started and before the timer expires, the secondary cell is in the activated state, and the terminal device 20 performs uplink transmission to the network device 10.

In some other embodiments, an uplink timer and a downlink timer is maintained between the network device 10 and the terminal device 20. Timeout duration of the uplink timer is represented as T0, and timeout duration of the downlink timer is represented as T01. T01 and T0 is equal or not equal. This is not limited in at least one embodiment. After the uplink timer is started and before the uplink timer expires, the secondary cell is in the activated state, and the terminal device 20 performs uplink transmission to the network device 10. After the downlink timer is started and before the downlink timer expires, the secondary cell is in the activated state, and the network device 10 performs downlink transmission to the terminal device 20.

In response to the uplink/downlink timer being configured, for the terminal device 20, in response to any UE-specific uplink grant downlink control information (DCI) or downlink scheduling DCI being detected at any moment before the timer expires, the terminal device 20 resets the uplink/downlink timer, restarts a new round of timing, and continues to detect whether the uplink grant DCI or the downlink scheduling DCI exists.

In response to the uplink timer and/or the downlink timer being separately configured, for the terminal device 20, in response to any UE-specific uplink grant DCI being detected at any moment before the uplink timer expires, the terminal device 20 resets the uplink timer, restarts a new round of timing, and continues to detect whether the uplink grant DCI exists. Similarly, in response to any UE-specific downlink scheduling DCI being detected at any moment before the downlink timer expires, the terminal device 20 resets the downlink timer, restarts a new round of timing, and continues to detect whether the downlink scheduling DCI exists. In this case, an uplink and downlink of the secondary cell are independently activated or deactivated. For example, in response to the uplink timer not expiring, an uplink of the secondary cell is in the activated state, but in this case, a downlink is in the activated state or is in a deactivated state.

The timer discussed in at least one embodiment is the uplink timer related to the uplink transmission. Specifically, the timer discussed in at least one embodiment is a maintained uplink/downlink timer or the uplink timer, and details are not described in the following again. In addition, the timer discussed in at least one embodiment is a deactivation timer or an uplink deactivation timer. However, because activation and deactivation are relative states, the deactivation timer is also referred to as an activation timer in some embodiments. This is not limited in at least one embodiment.

Additionally or optionally, before step 210 in FIG. 2, a process of determining and generating the suggestion information is further included. As shown in FIG. 2, the terminal device 20 determines 202 a service state of to-be-transmit data in the uplink, and determine 204 whether activation or deactivation of the at least one secondary cell meets the service state. Further, in response to determining that the service state is not met by means of determining, the terminal device 20 sends 210 the suggestion information.

In an implementation in which a timer is pre-configured, the terminal device 20 determines 204 whether the deactivation timer of the at least one secondary cell meets the service state. Correspondingly, the suggestion information includes timer duration information or timer adjustment amount information of the deactivation timer of the at least one secondary cell.

In some embodiments, a service prediction algorithm is used to determine the service state of the to-be-transmitted data in the uplink, and determine whether the deactivation timer of the at least one secondary cell meets the service state. Optionally, the service prediction algorithm used by the terminal device 20 is an artificial intelligence (AI) algorithm, for example, is a conventional machine learning algorithm or a deep learning algorithm.

Generally, machine learning is classified into three types based on a training method: Supervised learning, unsupervised learning, and reinforcement learning. The supervised learning refers to giving an algorithm a data set and giving a correct answer (labeling a data). The machine uses the data to learn how to process the correct answer. This way of helping machine learning through a large quantity of manual labeling is the supervised learning. This kind of learning is very effective, but also has higher costs. In the unsupervised learning, there is no "right answer" for a given data set, and all data is the same. A task of the unsupervised learning is to mine a potential structure from the given data set. The reinforcement learning is closer to an essence of biological learning, so that higher intelligence is gained. The reinforcement learning focuses on how an intelligent agent takes a set of behaviors in an environment to maximize cumulative returns. Through the reinforcement learning, the intelligent agent should know what behavior should be taken in what state. In the reinforcement learning, there are two types of methods, one is value-based and the other is policy-based. The combination of the two obtains an actor-critic method. Therefore, a policy gradient method uses an Actor-Critic framework. Actor models policies and Critic models value functions. In policy-based reinforcement learning, a policy generates probability corresponding to a series of actions in discrete action space, and generates probability density of continuous action space for continuous space. An action corresponding to the policy generation probability or probability density is performed with a high probability (to implement a maximum accumulated report obtained by using the policy), and then an action corresponding to a random selection probability is performed with a low probability (new actions explored gets a higher accumulated report).

In some embodiments, the service prediction algorithm determines, based on historical data of the terminal device 20, the service state of the to-be-transmitted data in the uplink by using a method such as regression analysis.

In a process in which a user uses the terminal device 20, data transmitted in the uplink by using the terminal device 20 has a certain regularity. For example, a quantity of users is positively correlated with a behavior pattern of using an application (APP) on the terminal device 20 by the user, and has a certain regularity. For example, data amount on weekends is larger than that on weekdays, and the data amount on nights is larger than that on daytime. Traffic volume on a day fluctuates, including peaks and troughs. Therefore, predicting uplink transmission traffic in real time is feasible by using the historical data.

Regression is a method of forecasting based on an "average" of the historical data (for example, over a certain period of time in the past). The regression is implemented in many manners, including but is not limited to: Linear regression, logistic regression, polynomial regression, stepwise regression, ridge regression, lasso regression, elasticNet regression, and the like. The regression is essentially curve fitting, which is a "conditional mean" forecast of different models. However, in the regression analysis, a desire for an unbiased prediction of the historical data does not guarantee accuracy of predicted future data.

In some embodiments, the service prediction algorithm determines, based on the historical data of the terminal device 20, the service state of the to-be-transmitted data in the uplink by using a machine learning algorithm. The machine learning algorithm is a conventional machine learning algorithm or a deep learning algorithm.

Different from the regression analysis, the machine learning algorithm does not pursue accuracy of an average value in response to prediction being performed. The deviation is allowed to exist, but the variance is reduced. With the continuous growth of data amount and the improvement of computing power, using the machine learning algorithm to make a prediction will be better than other methods. The machine learning algorithm is also referred to as an AI prediction algorithm, a traffic prediction algorithm, or the like, and includes a neural network-based deep learning algorithm. The neural network includes but is not limited to: Back propagation network, Elman neural network, long short term memory neural network, and the like.

For example, a training data set is constructed by using the historical data, and the training data set includes a large quantity of training data. Subsequently, training is performed on a basis of the training data set, to obtain a neural network structure that is converged or meets a training ending condition (for example, defined by using a loss function). In some examples, a validation set further is constructed to verify the trained neural network. Further, the trained neural network is used to perform service prediction, to obtain a service state of to-be-transmitted data in the uplink.

The AI algorithm performs training based on a large quantity of data, and includes a large quantity of training parameters to comprehensively consider various factors. Therefore, in at least one embodiment, the terminal device 20 determines the service state by using the AI algorithm, and the various factors is also fully considered, so that the determined service state is more accurate and has high reliability. This prevents inaccurate resource allocation caused by inaccurate prediction and affects resource utilization.

The service state is also referred to as a service feature or another name, and indicates some service attributes related to service transmission. The service state includes, for example, an arrival time, an arrival periodicity, a transmission packet size, and/or a service transmission channel quality. The foregoing example of the service state is merely illustrative and not limiting, and the service state also includes other information related to the service.

Figure 3:
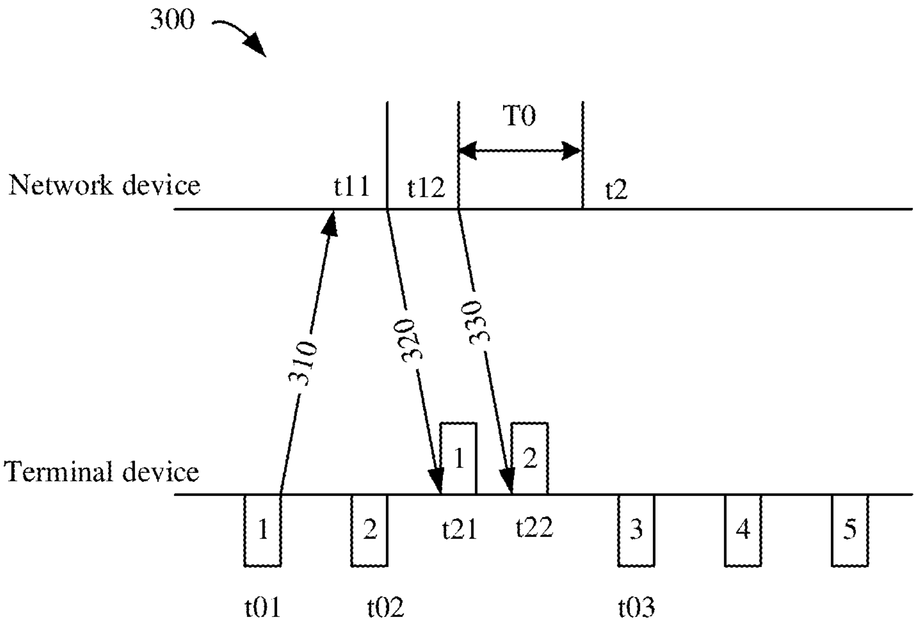
FIG. 3 is a schematic diagram of a case 300 in which a terminal device determines that a timer does not meet a service state according to at least one embodiment.
Figure 4:
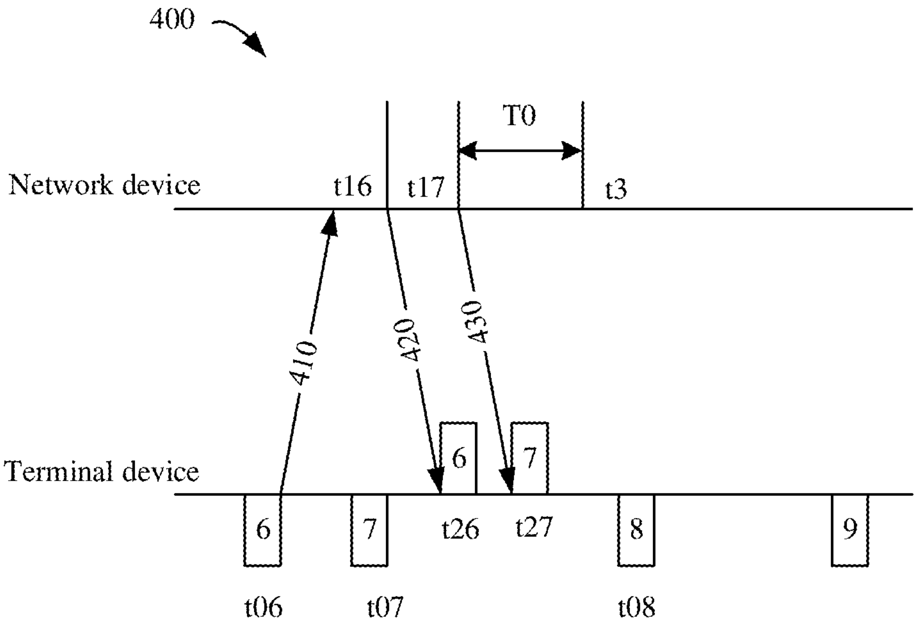
FIG. 4 is a schematic diagram of another case 400 in which a terminal device determines that a timer does not meet a service state according to at least one embodiment.

The following describes an embodiment in which the terminal device 20 determines that the deactivation timer does not meet the service state by using an example with reference to FIG. 3 and FIG. 4.

FIG. 3 is a schematic diagram of a case 300 in which a terminal device 20 determines that a timer does not meet a service state according to at least one embodiment. The data transmitted by the terminal device 20 to the network device 10 in FIG. 3 includes a packet 1, a packet 2, a packet 3, . . . , and the like. The terminal device 20 determines, in a process of transmitting the packet 1 and the packet 2, a service state of the packet 3, the packet 4, . . . that are to be transmitted in the uplink, and determine whether a de-timer meets the service state.

For example, the terminal device 20 determines that an arrival time of the to-be-transmitted data in the uplink changes (for example, later), but an arrival periodicity remains unchanged. In addition, because the arrival time is later, before the data arrives, the secondary cell is deactivated because the timer expires.

As shown in FIG. 3, an arrival moment of the packet 1 on the terminal device 20 is a moment t01. Then, the terminal device 20 sends 310 a scheduling request (SR) or a buffer state report (BSR) to the network device 10. The network device 10 starts or resets the timer at a moment t11 at which the SR or the BSR is received, and sends 320 uplink grant information available to the terminal device 20. The terminal device 20 starts the timer at a moment t21 in response to receiving 320 the uplink grant information, and starts to perform uplink transmission for the packet 1 by using an uplink grant transmission resource. Similarly, a similar process is performed for the packet 2 arriving at a moment t02. Because duration from t11 to t12 is less than the timeout duration T0 of the timer, at t12, the network device 10 resets the timer and sends 330 uplink grant information available to the terminal device 20. Similarly, the terminal device 20 also resets the timer at a moment t22 in response to receiving the uplink grant information, and starts to perform uplink transmission for the packet 2 by using the uplink grant transmission resource. In the uplink transmission process of the packet 1 and the packet 2, the secondary cell is in the activated state. Because a periodicity between the packet 2 and the packet 1 is less than the timeout duration of the timer, the timer does not expire in the process. In some embodiments, in a process of transmitting the packet 1 and the packet 2, the terminal device 20 determines, in a manner such as prediction, that an arrival time of the packet 3 becomes later. That is, a time interval t03-*t*02 between an arrival moment t03 of the packet 3 and an arrival moment t02 of the packet 2 is greater than a time interval t02-*t*01 between the packet 2 and the packet 1. In this case, the network device cannot receive a transmission request for the packet 3 within subsequent timeout duration (it is assumed that T0) starting from the moment t12, and at the moment t2 shown in FIG. 3, the secondary cell is deactivated. Similarly, for the terminal device 20, after the time duration T0 elapses from a moment t22, the timer expires (not shown in FIG. 3). In response to the determined arrival time of the packet 3 becoming later, the deactivated secondary cell cannot continue to be used to assist in performing uplink transmission. Therefore, the terminal device 20 determines that a transmission delay of the packet 3 (including the pack 4, a pack 5 after the pack 3) increases. Further, the terminal device 20 determines that the deactivation timer does not meet the service state.

FIG. 4 is a schematic diagram of a case 400 in which a terminal device 20 determines that a timer does not meet a service state according to at least one embodiment. The data transmitted by the terminal device 20 to the network device 10 in FIG. 4 includes a packet 6, a packet 7, a packet 8, . . . , and the like. The terminal device 20 determines, in a process of transmitting a packet 6 and a packet 7, a service state of a packet 8, a packet 9, . . . that are to be transmitted in the uplink, and determine whether the deactivation timer meets the service state.

For example, the terminal device 20 determines that a periodicity of the to-be-transmitted data in the uplink changes (for example, the periodicity becomes larger), a size of each packet remains unchanged, and because the periodicity is increased, the data arrives relatively late. Therefore, before the data arrives, the secondary cell is deactivated because the timer expires.

As shown in FIG. 4, an arrival moment of the packet 6 at the terminal device 20 is a moment t06, and then the terminal device 20 sends 410 SR or BSR to the network device 10. The network device 10 starts or resets the timer at a moment t16 at which the SR or the BSR is received, and sends 420 uplink grant information available to the terminal device 20. The terminal device starts the timer at a moment t26 in response to receiving 420 the uplink grant information, and starts to perform uplink transmission for the packet 6 by using an uplink grant transmission resource. Similarly, a similar process is performed for the packet 7 arriving at a moment t07. Because duration from t16 to t17 is less than the timeout duration T0 of the timer, at t17, the network device 10 resets the timer and sends 430 uplink grant information available to the terminal device 20. Similarly, the terminal device 20 also resets the timer at a moment t27 in response to receiving the uplink grant information, and starts to perform uplink transmission for the packet 7 by using the uplink grant transmission resource. The uplink transmission process of the packet 6 and the packet 7, the secondary cell is in the activated state. Because a periodicity between the packet 7 and the packet 6 is less than the timeout duration of the timer, the timer does not expire in the process. In some embodiments, in a process of transmitting the packet 6 and the packet 7, the terminal device 20 determines, in a manner such as prediction, that a periodicity of the packet 8 and the packet 9 that are to be transmitted in the uplink is increased, that is, a periodicity between the packet 8 and the packet 7 is greater than a periodicity between the packet 7 and the packet 6. In this case, the network device 10 cannot receive a transmission request for the packet 8 again in duration T0 from the moment t17. In this case, at the moment t3 shown in FIG. 4, the secondary cell is deactivated. Similarly, for the terminal device 20, after the time duration T0 elapses from a moment t27, the timer expires (not shown in FIG. 4). In response to the determined periodicity after the packet 8 becoming larger, the deactivated secondary cell cannot continue to be used to assist in performing uplink transmission. Therefore, the terminal device 20 determines that a transmission delay of the packet 8 (including the packet 9 after the packet 8) increases. Further, the terminal device 20 determines that the deactivation timer does not meet the service state.

With reference to FIG. 3 and FIG. 4, only some but not limiting examples are provided above. Alternatively, other cases cause the deactivation timer cannot meet the service state of the to-be-transmitted data in the uplink, and details are not listed one by one herein again.

For example, the terminal device 20 generates the suggestion information based on the determined service state of the to-be-transmitted data in the uplink and the timeout duration of the deactivation timer, and further send 210 the suggestion information to the network device 10. Specifically, the suggestion information includes timer duration information or timer adjustment amount information of the deactivation timer of the at least one secondary cell. The suggestion information indicates a suggestion that the terminal device 20 updates or adjusts the timeout duration of the deactivation timer.

In some embodiments, the timer duration information directly indicates a suggestion of the terminal device 20 for the timeout duration of the deactivation timer. That is, the terminal device 20 indicates, by using timer duration information T1, that the terminal device 20 recommends updating the timeout duration to T1. In some embodiments, the timer adjustment amount information indirectly indicates a suggestion of the terminal device 20 for the timeout duration of the deactivation timer. The timer adjustment amount information is also referred to as timer change amount information or timer change information, which is not limited in at least one embodiment. For example, the terminal device 20 indicates, by using timer adjustment amount information $\Delta T$, that the terminal device 20 recommends adjusting an adjustment amount $\Delta T$ based on an original timeout duration T0, so as to indirectly indicate that the recommended timeout duration of the terminal device 20 is $T0+\Delta T$. The adjustment amount is positive, that is, $\Delta T>0$, to indicate an increment. The adjustment amount is negative, that is, $\Delta T<0$, to indicate a reduction. In at least one embodiment, the suggestions for the timer adjustment amount information is collectively referred to as suggestions for the timer, and the suggestions for the timer include timing duration information or timer adjustment amount information.

For example, the suggestion information is sent 210 by using a radio resource control (RRC) message. That is, the suggestion information is included in the RRC message. Optionally, the RRC message is any RRC message that already exists before 3GPP standard release 16 (R16), or optionally, the RRC message is any RRC message that appears in or after R16, or optionally, the RRC message is an RRC message newly defined for the suggestion information.

In an embodiment, the RRC message is an RRC connection resume complete message. In other words, the terminal device 20 sends 210 the RRC connection resume complete message to the network device 10. The RRC connection resume complete message includes the suggestion information.

In another embodiment, the RRC message is an RRC setup complete message. In other words, the terminal device 20 sends 210 the RRC setup complete message to the network device 10. The RRC setup complete message includes the suggestion information.

In yet another embodiment, the RRC message is an RRC reconfiguration complete message. In other words, the terminal device 20 sends 210 the RRC reconfiguration complete message to the network device 10. The RRC reconfiguration complete message includes the suggestion information.

In some embodiments, an RRC message is newly defined to send the suggestion information. For example, the newly defined RRC message is an RRC recommendation message, an AI assistance message, another message, or the like. In an embodiment, the RRC message is an RRC recommendation message. In other words, the terminal device 20 sends 210 the RRC recommendation message to the network device 10. The RRC recommendation message includes the suggestion information.

For example, in response to the suggestion information 210 being sent by using the RRC message, the suggestion information is carried in one or some specific fields of the RRC message. In some embodiments, the specific field is a reserved field, a newly defined field, an existing field for another purpose, or the like. In an example, the suggestion information is transmitted by using a reserved field in the RRC message. In another example, the suggestion information is transmitted by using an existing field in the RRC message, for example, a UEAssistanceInformation field (UEAssistanceInformation). In another example, the suggestion information is transmitted by using a newly defined additional field in the RRC message, for example, is an AI assistance information field that is additionally defined in the RRC recommendation message or the AI assistance message.

In this way, in at least one embodiment, the suggestion information is transmitted by using the RRC message, so that an existing RRC format is fully utilized, and the network device 10 accurately obtains the suggestion information in a timely manner.

Although the suggestion information is sent by using the RRC message above, at least one embodiment is not limited thereto. For example, the suggestion information is sent by using another type of RRC message or by using another message other than the RRC message. This is not limited in at least one embodiment.

In this implementation, the suggestion information includes timer duration information or timer adjustment amount information of the deactivation timer of the at least one secondary cell. In some embodiments, the deactivation timer of the at least one secondary cell includes uplink/downlink deactivation timers of the terminal device 20 and the network device 10. In some embodiments, the deactivation timer of the at least one secondary cell includes uplink deactivation timers of the terminal device 20 and the network device 10.

In some embodiments, the timer duration information indicates a suggestion of the terminal device 20 for updating the timeout duration of the deactivation timer of the at least one secondary cell. For example, the timer duration information is represented as T1, and indicates that the terminal device 20 suggests updating the timeout duration of the deactivation timer of the at least one secondary cell to T1.

In some embodiments, the timer adjustment amount information indicates a suggestion for the terminal device 20 to adjust the timeout duration of the deactivation timer of the at least one secondary cell. For example, the timer adjustment amount information is represented as ΔT, and indicates that the terminal device 20 suggests adjusting the timeout duration of the deactivation timer of the at least one secondary cell. In addition, the adjustment amount ΔT is greater than 0, indicating an increment, and the adjustment amount ΔT is less than 0, indicating a decrement.

For example, in response to the terminal device 20 obtaining, based on the service state of the to-be-transmitted data in the uplink, that expected timeout duration is T1, in some embodiments, the timer duration information T1 is directly used for indication. In some other embodiments, the timer adjustment amount information $\Delta T=T1-T0$ is indirectly used for indication. ΔT is a positive value, indicating that the adjustment amount is positive, that is, a suggestion for increasing the timeout duration of the deactivation timer. ΔT is a negative value, indicating that the adjustment amount is negative, that is, a suggestion for decreasing the timeout duration of the deactivation timer.

Optionally, for a scenario in which one uplink/downlink timer exists, the timer duration information T1 is carried by using a field of a secondary cell deactivation timer preference, for example, sCellDeactivationTimerPreference. Optionally, for a scenario in which one uplink timer exists, the timer duration information T1 is carried by using a field of secondary cell deactivation timer preference or a field of secondary cell uplink deactivation timer preference, for example, sCellDeactivationTimerPreference or sCellULDeactivationTimerPreference. Optionally, for a scenario in which an uplink timer and a downlink timer exist, the timer duration information T1 is carried by using a field of the secondary cell uplink deactivation timer preference, for example, sCellULDeactivationTimerPreference. For example, a value range of the timer duration information is: ms20, ms40, ms80, . . . , ms1280. Certainly, the timer duration information is also represented in another form and range.

Optionally, a choice (CHOICE) structure or an enumerate (ENUMERATE) structure is used to carry the timer adjustment amount information. Another similar or completely different structure is also used to carry the timer adjustment amount information. This is not limited in at least one embodiment.

In some embodiments, additionally, the suggestion information further includes at least one of the following: effective time length information, probability information, target information, or reward information.

In this way, in response to receiving the suggestion information, the network device 10 simultaneously obtains some reference information used in response to the terminal device 20 determining the suggestion information, so that the network device 10 determines the configuration parameter by considering more comprehensive reference information, thereby improving accuracy.

In some embodiments, the suggestion information further includes effective time length information, which indicates effective time of the suggestion information, for example, suggested timer duration information or effective time of the timer adjustment amount information. In other words, after the effective time expires, the timer duration information or the timer adjustment amount information is not suggested. Specifically, in response to the AI algorithm being used for prediction, the effective time corresponding to the suggestion information of the timer (for example, directly suggested duration information T1 or indirectly suggested adjustment amount information ΔT) is obtained. For example, the enumerate (ENUMERATE) structure is used to carry the effective time length information. Another similar or completely different structure is used to carry the effective time length information. This is not limited in at least one embodiment. For example, enumeration structures m0.1, m0.2, m0.5, m1, m2, m4, m8, and m10 is used to sequentially represent 0.1 minute, 0.2 minute, 0.5 minute, 1 minute, 2 minutes, 4 minutes, 8 minutes, and 10 minutes.

In some embodiments, the suggestion information further includes probability information, which indicates confidence of the suggestion information, for example, confidence of the suggested timer duration information or the timer adjustment amount information. Specifically, in response to performing prediction by using the AI algorithm, the terminal device 20 obtains a plurality of pieces of timer duration information or timer adjustment amount information, and simultaneously obtain corresponding probability information.

The timer duration information is used as an example. For example, the timer duration information T11 corresponds to the probability information P11. The timer duration information T12 corresponds to the probability information P12. The timer adjustment amount information is used as an example. For example, the timer adjustment amount information ΔT21 corresponds to the probability information P21. The timer adjustment amount information ΔT22 corresponds to the probability information P22.

The timer duration information is used as an example. In some embodiments, the suggestion information includes timer duration information with maximum probability information. Additionally, probability information corresponding to the timer duration information is further included. In some other embodiments, the suggestion information includes a plurality of groups of pieces of timer duration information and corresponding probability information. For example, the suggestion information includes a preset quantity group with maximum probability information. For example, the preset quantity is N. In this case, the probability information is sorted in descending order, and first N groups are obtained as the suggestion information, as an example, as shown in the following Table 1.

TABLE 1

| Timer duration information | Probability information |
|---|---|
| T11 | P11 |
| T12 | P12 |
| T12 | P13 |
| . . . | . . . |

For example, the enumerate structure is used to carry the corresponding probability information. In some embodiments, the probability information is represented by using an enumerate structure of a first preset length. For example, any probability is represented by using a 4-bit enumerate structure: 0%, 5%, 10%, 15%, 20%, 30%, 37%, 44%, 50%, 56%, 63%, 70%, 80%, 90%, 95%, and 100%. For example, the probability information is also represented by using a 5-bit enumerate structure. For example, an intermediate value is added between the probability information represented by the foregoing 4-bit. Another structure or manner is used to carry the probability information. This is not limited in at least one embodiment.

In some embodiments, the suggestion information further includes target information, which indicates a target based on which the suggestion information is based, for example, a target based on which the suggested timer duration information or the timer adjustment amount information is based. Specifically, in response to the terminal device 20 performing prediction by using the AI algorithm, the suggestion is obtained for a specific target. In this case, the target information is referred to as a target obtained in response to the suggestion being obtained. For example, the target information includes: an energy saving target, a low latency target, and a high reliability target.

For example, the target information is represented by using an enumerate structure of a second preset length. In an example, the target information is carried by using a 1-bit enumerate structure. For example, "0" represents an energy saving target, and "1" represents a low latency target. In another example, the target information is carried by using a 2-bit enumerate structure. For example, "00" represents an energy saving target, "01" represents a low latency target, and "10" represents a high reliability target. In addition, another structure or manner is used to carry the target information. This is not limited in at least one embodiment.

In some embodiments, the suggestion information further includes reward information, which indicates an observation result obtained in response to the terminal device 20 determining the suggestion information, for example, an observation result obtained in response to the terminal device 20 determining the suggested timer duration information or the timer adjustment amount information. For example, in response to the terminal device 20 determining the timer duration information or the timer adjustment amount information, the network device 10 determines a reward to the terminal device 20. Specifically, in response to performing prediction by using the AI algorithm (such as the reinforcement learning), the terminal device 20 simultaneously predicts and obtains the reward.

For example, the reward information is represented by using an enumerate structure of a third preset length. For example, the reward information is carried by using a 10-bit enumerate structure, for example, representing −1024, −1022, . . . , 1022, and 1024. Optionally, the maximum value of the reward information is pre-configured by the network device 10, for example, is 1024. Another structure or manner is used to carry the reward information. This is not limited in at least one embodiment.

Although "a first preset length", "a second preset length", and "a third preset length" are respectively illustrated above, the three are capable of being equal to each other. In fact, "first", "second", and "third" in at least one embodiment are independent of each other. For example, is not equal to each other, and two or all of them are equal to each other. This is not limited in at least one embodiment.

Based on the foregoing description, in this implementation, the suggestion information includes the timer duration information or the timer adjustment amount information, and further includes: effective time length information, probability information, target information, reward information, or any combination thereof. In some embodiments, the terminal device 20 indicates, by using an uplink configuration preference list (UplinkConfiguredPreferenceList) in the RRC message, categories included in the suggestion information.

In some embodiments, categories included in the suggestion information and a quantity of suggestion information is indicated. For example, categories included in the suggestion information are: suggestions for a timer, effective time length information, probability information, target information, and reward information. the quantity of suggestion information is N, and N is a positive integer.

Using N=3 as an example, the suggestion information includes the following three groups: (1) Suggestion 1 for the timer, effective time length information 1, probability information 1, target information 1, and reward information 1. (2) Suggestion 2 for the timer, effective time length information 2, probability information 2, target information 2, and reward information 2. (3) Suggestion 3 for the timer, effective time length information 3, probability information 3, target information 3, and reward information 3.

In this way, the network device 10 accurately knows which categories are included in the suggestion information in the RRC message, so that parsing and processing is performed more quickly, thereby improving processing efficiency.

In this implementation, the network device 10 receives 210 an RRC message from the terminal device 20, where the RRC message includes the suggestion information. Optionally, the RRC message is one of the following messages: an RRC connection resume complete message, an RRC setup complete message, an RRC reconfiguration complete message, an RRC recommendation message, or an AI assistance message.

As shown in FIG. 2, in some embodiments, the network device 10 determines 220, based on the received suggestion information, a configuration parameter for activating or deactivating the at least one secondary cell.

Specifically, the network device 10 determines 220, based on the suggestion information and a load state of the network device 10, the configuration parameter for activating or deactivating the at least one secondary cell.

In this implementation, the configuration parameter includes configuration information of timing duration of the deactivation timer of the at least one secondary cell, or configuration information of an adjustment amount of the deactivation timer of the at least one secondary cell.

As shown in FIG. 2, in some embodiments, the terminal device 20 receives 230 the configuration parameter from the network device 10.

In some embodiments, the terminal device 20 receives 230 an RRC reconfiguration message from the network device 10, where the RRC reconfiguration message includes a configuration parameter.

The configuration parameter indicates update information of the deactivation timer of the at least one secondary cell, and is explicitly indicated or is implicitly indicated. In some embodiments, the configuration parameter includes configuration information of the timing duration of the deactivation timer of the at least one secondary cell, and indicate to update the timeout duration of the deactivation timer to the timing duration indicated by the configuration parameter. In some other embodiments, the configuration parameter includes configuration information of the adjustment amount of the deactivation timer of the at least one secondary cell, and indicate to execute the adjustment amount indicated by the configuration parameter based on timeout duration of the deactivation timer.

Additionally or optionally, as shown in FIG. 2, in some embodiments, the terminal device 20 updates 232 the deactivation timer of the at least one secondary cell based on the configuration parameter. For example, the timeout duration is updated from T0 to T2. Further, in response to the updated deactivation timer not expiring, the terminal device 20 performs uplink data transmission.

In this way, in this implementation, the terminal device 20 sends a suggestion about the deactivation timer of the at least one secondary cell to the network device 10 by using the RRC message, so that the network device 10 meets a usage parameter of the terminal device 20 for the deactivation timer in a timely manner. In this way, the network device 10 adjusts the deactivation timer of the secondary cell in a timely manner, thereby ensuring data transmission efficiency of the terminal device 20, and improving resource utilization.

In another implementation, the suggestion information indicates, in an explicit manner, the suggestion for activating or deactivating the at least one secondary cell. For example, indication is performed by using an indicator. For example, in response to the indicator being a first value, a corresponding secondary cell is deactivated, in response to the indicator being a second value, a corresponding secondary cell is activated, and the second value is not equal to the first value.

Additionally or optionally, as shown in FIG. 2, the terminal device 20 determines 202 the service state of the to-be-transmitted data in the uplink; and determine 204 whether activation or deactivation of the at least one secondary cell meets the service state. Further, in response to determining that the service state is not met by means of determining, the terminal device 20 sends 210 the suggestion information. In some embodiments, the suggestion information includes an indicator corresponding to activation or deactivation of the at least one secondary cell.

For example, in response to the terminal device 20 determining that: at an arrival time of the to-be-transmitted data in the uplink, the secondary cell is in a deactivated state; or at an arrival time of the to-be-transmitted data in the uplink, although the secondary cell is in the activated state, an available transmission resource (for example, a time-frequency resource) is too small to meet uplink transmission of the data.

In this implementation, for a manner of determining the service state and determining whether the service state is met by the terminal device 20, refer to the description of the related embodiment in the foregoing implementation. To avoid repetition, details are not described herein again.

In some embodiments, the terminal device 20 generates suggestion information based on the determined service state of the to-be-transmitted data in the uplink and the activated or deactivated state of the at least one secondary cell, and further send 210 the suggestion information to the network device 10. The suggestion information indicates a suggestion for activating or deactivating the at least one secondary cell. In this embodiment, in response to the secondary cell being in the deactivated state, both uplink transmission and downlink transmission are deactivated.

In some other embodiments, the suggestion information indicates activation or deactivation of the uplink of the at least one secondary cell, and no suggestion is provided for activation or deactivation of a downlink of the at least one secondary cell. In this embodiment, in response to the uplink of the secondary cell being in the deactivated state, the uplink transmission is deactivated, and the downlink transmission is activated or deactivated.

For example, the terminal device 20 sends 210 the suggestion information by using a first medium access control (MAC) control element (CE). In other words, the suggestion information is included in the first MAC CE. For example, the first MAC CE is an uplink MAC CE.

For example, a logical channel identifier (LCID) in a MAC sub-header in the first MAC CE indicates that the first MAC CE includes the suggestion information. The LCID has a predefined length, for example, 6-bit. In some embodiments, the LCID uses a reserved value, for example, any of 33 to 51. For example, LCID=33 indicates that the first MAC CE includes the suggestion information. Correspondingly, in response to receiving the first MAC CE, in response to determining that the LCID=33, the network device 10 determines that the first MAC CE includes the suggestion information, and further reads or parses the suggestion information.

In this way, in response to the LCID in the MAC sub-header of an uplink MAC CE being equal to any reserved value (for example, any value in 33 to 51), the uplink MAC CE is a suggested MAC CE, thereby implementing consistency of message content between the terminal device 20 and the network device 10. This helps the network device 10 quickly and accurately obtain a message type, and conveniently and correctly parse the suggestion information.

In some embodiments, the suggestion information is represented by using an indicator at a position corresponding to the secondary cell in the first MAC CE.

Additionally, in some embodiments, the suggestion information further includes at least one of the following: effective time length information, probability information, target information, or reward information.

In this way, in response to receiving the suggestion information, the network device 10 obtains some reference information for determining the suggestion information by the terminal device 20, so that the network device 10 determines the configuration parameter by considering more comprehensive reference information, thereby improving accuracy.

In some embodiments, the suggestion information further includes effective time length information, which indicates effective time of the suggestion information, for example, effective time of a suggestion for activating or deactivating the at least one secondary cell. In other words, after the effective time expires, the suggestion is considered invalid. Specifically, in response to the AI algorithm being used for prediction, effective time corresponding to activation or deactivation of the at least one secondary cell is obtained. For example, the effective time length information is carried by using a quantity of bits of a first length. For example, the effective time is 0.1 minute, 0.2 minute, 0.5 minute, 1 minute, 2 minutes, 4 minutes, 8 minutes, or 10 minutes.

In some embodiments, the suggestion information further includes probability information, which indicates confidence of the suggestion information, for example, confidence of a suggestion for activating or deactivating the at least one secondary cell. Specifically, in response to performing prediction by using the AI algorithm, the terminal device 20 obtains activation or deactivation of the at least one secondary cell, and simultaneously obtain corresponding probability information.

For example, the first secondary cell is activated, and the second secondary cell is deactivated, corresponding to probability information P14. The first secondary cell is activated, and the second secondary cell is activated, corresponding to probability information P15.

In some embodiments, the suggestion information includes a suggestion for activating or deactivating at least one secondary cell corresponding to a maximum value of the probability information. Additionally, probability information of the maximum value is further included. For example, a quantity of bits of a second length is used to carry the probability information. For example, the probability information is 0%, 5%, 10%, 15%, 20%, 30%, 37%, 44%, 50%, 56%, 63%, 70%, 80%, 90%, 95%, or 100%.

In some embodiments, the suggestion information further includes target information, which indicates a target on which the suggestion information is based, for example, a target on which a suggestion for activating or deactivating the at least one secondary cell is based. Specifically, in response to the terminal device 20 performing prediction by using the AI algorithm, the suggestion is obtained for a specific target. In this case, the target information is referred to as target information obtained in response to the suggestion being obtained. For example, the target information includes: an energy saving target, a low latency target, and a high reliability target. For example, a quantity of bits of a third length is used to carry the target information.

In some embodiments, the suggestion information further includes reward information, which indicates an observation result obtained in response to the terminal device 20 determining the suggestion information, for example, an observation result obtained in response to the terminal device 20 determining a suggestion for activating or deactivating the at least one secondary cell. For example, in response to the terminal device 20 determining that the at least one secondary cell is activated or deactivated, the network device 10 determines a reward to the terminal device 20. Specifically, in response to performing prediction by using the AI algorithm (such as the reinforcement learning), the terminal device 20 simultaneously predicts and obtains the reward.

For example, a quantity of bits of a fourth length is used to carry the reward information. For example, the reward information is −1024, −1022, . . . , 1022, or 1024. Optionally, the maximum value of the reward information is preconfigured by the network device 10, for example, is 1024.

Although "a quantity of bits of a first length", "a quantity of bits of a second length", "a quantity of bits of a third length", and "a quantity of bits of a fourth length" are respectively illustrated above, the terms are capable of being equal to each other. In fact, "first", "second", "third", and "fourth" in at least one embodiment are independent of each other, for example, is not equal to each other, and some (for example, two) or all are equal to each other. This is not limited in at least one embodiment.

Based on the foregoing description, in this implementation, the suggestion information includes activation/deactivation of the at least one secondary cell, for example, indicated by using the indicator. The suggestion information further includes at least one of the following: effective time length information, probability information, target information, or reward information.

Figure 5:
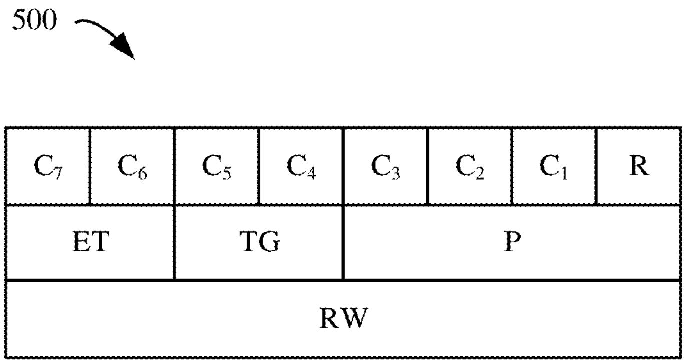
FIG. 5 is a schematic diagram of a schematic structure 500 for carrying suggestion information in a MAC CE according to at least one embodiment.

FIG. 5 is a schematic structure 500 for carrying suggestion information in a MAC CE according to at least one embodiment. In the structure 500, R represents a bit corresponding to a primary cell, and a default value or a reserved value is used. $C_1$ to $C_7$ in the structure 500 is used to indicate indicators of activation or deactivation of the first secondary cell to the seventh secondary cell. In addition, as shown in FIG. 5, the structure 500 further includes other information than the indicator. Specifically, ET represents effective time length information, TG represents target information, P represents probability information, and RW represents reward information.

The terminal device 20 indicates, in the MAC CE, whether a corresponding $C_i$ exists by using a secondary cell index (ScellIndex) i. Correspondingly, the network device 10 obtains the corresponding $C_i$ by using the secondary cell index (ScellIndex) i. Similarly, in response to a secondary cell index j not existing, the network device 10 ignores a corresponding $C_j$. In some embodiments, $C_i$=a first value indicates that a corresponding secondary cell is deactivated, and $C_i$=a second value indicates that a corresponding secondary cell is activated. For example, the first value is 0, and the second value is 1.

R and $C_1$ to $C_7$ in the structure 500 of FIG. 5 jointly occupy 1 byte, and the structure 500 of FIG. 5 is merely an example rather than a limitation.

In some embodiments, the LCID in the MAC sub-header of the first MAC CE is set to a first reserved value, for example, 33, to indicate that the first MAC CE includes indicators corresponding to 7 secondary cells. In response to a quantity of secondary cells being less than or equal to 7, the structure 500 shown in FIG. 5 is used.

In some embodiments, a sequence of $C_1$ to $C_7$ in FIG. 5 is corresponding to a sequence of all secondary cells in a serving cell of the terminal device 20. For example, a first secondary cell SCell1 provides downlink auxiliary transmission, and a second secondary cell Scell2 provides uplink and downlink auxiliary transmission, $C_1$ corresponds to the first secondary cell Scell1, and is the default value or the reserved value, C2 corresponds to the second secondary cell Scell2, and is an activation or deactivation indicator.

In some other embodiments, a sequence of $C_1$ to $C_7$ in FIG. 5 is corresponding to a sequence of all secondary cells that provide uplink assistance and that are in the serving cell of the terminal device 20. For example, the first secondary cell Scell1 provides downlink assistance, the second secondary cell Scell2 provides uplink and downlink assistance, . . . , and an $M^{th}$ secondary cell Scellm provides uplink assistance. Based on the sequence of secondary cells, the Scell2 is a first secondary cell that provides uplink assistance for the terminal device 20. Therefore, $C_1$ corresponds to the second secondary cell SCell2, and is the activation or deactivation indicator. In this way, the suggestion information is provided only for the secondary cell that provides uplink assistance, so that characters in the MAC CE is fully utilized, and excessive invalid characters are avoided, thereby saving transmission resources, and improving transmission efficiency.

In some embodiments, the first value is used to indicate deactivation, and the second value different from the first value is used to indicate activation. In an example, the first value is 0, and the second value is 1. Deactivation and activation is also respectively represented in other manners. This is not limited in at least one embodiment.

Figure 6:
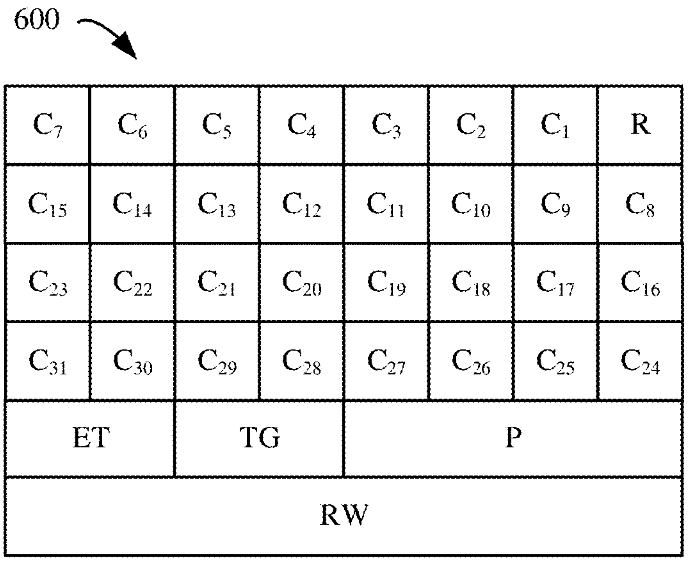
FIG. 6 is a schematic diagram of another schematic structure 600 for carrying suggestion information in a MAC CE according to at least one embodiment.

FIG. 6 is another schematic structure 600 for carrying suggestion information in a MAC CE according to at least one embodiment. In the structure 600, R represents a bit corresponding to a primary cell, and a default value or a reserved value is used. The structure 600 further includes $C_1$ to $C_{31}$, corresponding to indicators of activation or deactivation of 31 secondary cells. In addition, as shown in FIG. 6, the structure 600 further includes other information than the indicator. Specifically, ET represents effective time length information, TG represents target information, P represents probability information, and RW represents reward information.

R and $C_1$ to $C_{31}$ in the structure 600 of FIG. 6 jointly occupy 4 bytes, and the structure 600 of FIG. 6 is merely an example rather than a limitation.

In some embodiments, the LCID in the MAC sub-header of the first MAC CE is set to a second reserved value, for example, 34, to indicate that the first MAC CE includes indicators corresponding to 31 secondary cells. In response to the quantity of secondary cells being greater than 7 and not greater than 31, the structure 600 shown in FIG. 6 is used.

In some embodiments, a sequence of $C_1$ to $C_{31}$ in FIG. 6 is corresponding to a sequence of all secondary cells in a serving cell of the terminal device 20. Alternatively, a sequence of $C_1$ to $C_{31}$ in FIG. 6 is corresponding to a sequence of all secondary cells that provide uplink assistance and that are in the serving cell of the terminal device 20. Similarly, reference is made to the foregoing content described with reference to FIG. 5, and details are not described herein again.

Similarly, the secondary cell index (ScellIndex) i is used to indicate that the corresponding $C_i$ is obtained. In response to the secondary cell index j not existing, the corresponding $C_j$ is ignored.

Although the suggestion information shown in FIG. 5 and FIG. 6 includes the effective time length information, the target information, the probability information, and the reward information, this is not limited in at least one embodiment. For example, only a part of the effective time length information, the target information, the probability information, and the reward information is included, or even none of them is included. In addition, even in response to quantities of bits being occupied by the effective time length information, the target information, the probability information, and the reward information are respectively shown in FIG. 5 and FIG. 6, for example, the quantity of bits of the first length occupied by the effective time length information is 2, the quantity of bits of the second length occupied by the target information is 2, the quantity of bits of the third length occupied by the probability information is 4, and the quantity of bits of the fourth length occupied by the reward information is 8. However, this is not limited in at least one embodiment. For example, any one of them occupies more or less bits. The target information is used as an example. In an example, the quantity of bits of the second length is 2. For example, “TG=00” indicates an energy saving target, “TG=01” indicates a low latency target, and “TG=10” indicates a high reliability target. In another example, the quantity of bits of the second length is 1. For example, “TG=0” indicates an energy saving target, and “TG=1” indicates a low latency target.

IN this implementation, the network device 10 receives 210 a first MAC CE from the terminal device 20, where the first MAC CE includes the suggestion information.

In this implementation, as shown in FIG. 2, in some embodiments, the network device 10 determines 220, based on the received suggestion information, the configuration parameter for activating or deactivating the at least one secondary cell.

Specifically, the network device 10 determines 220, based on the suggestion information and a load state of the network device 10, the configuration parameter for activating or deactivating the at least one secondary cell. In this implementation, the configuration parameter includes configuration information for activating or deactivating the at least one secondary cell.

In some embodiments, the configuration parameter is also referred to as an air interface parameter, an air interface configuration parameter, or the like. This is not limited in at least one embodiment. In this way, the network device 10 in at least one embodiment considers the suggestion information of the terminal device 20 in response to determining the configuration parameter, so that the determined configuration parameter satisfy the terminal device 20, for example, satisfy low latency and energy saving of an uplink service of the terminal device 20.

As shown in FIG. 2, the terminal device 20 receives 230 the configuration parameter from the network device 10.

In some embodiments, the terminal device 20 receives 230 a second MAC CE from the network device 10, where the second MAC CE includes the configuration parameter. For example, the second MAC CE is a downlink MAC CE.

The configuration parameter indicates activation or deactivation of the at least one secondary cell. In some embodiments, the LCID in the MAC sub-header of the second MAC CE is equal to 58 or 57, and respectively indicates that a 1-byte or 4-byte structure indicates activation or deactivation of the secondary cell.

Additionally or optionally, as shown in FIG. 2, in some embodiments, the terminal device 20 updates the activated or deactivated state of the at least one secondary cell 232 based on the configuration parameter. For example, in response to a secondary cell being originally deactivated, and the secondary cell is activated in the configuration parameter, the secondary cell is updated to be activated. Further, the terminal device 20 performs uplink data transmission based on updated activation/deactivation of the at least one secondary cell.

In this way, in this implementation, the suggestion about the activation or deactivation of the at least one secondary cell is sent to the network device 10 by using the MAC CE, so that the network device 10 satisfy a usage parameter of the terminal device 20 for activating or deactivating of the at least one secondary cell in a timely manner. In this way, the network device adjusts the activation or deactivation of the at least one secondary cell in a timely manner, thereby ensuring data transmission efficiency of the terminal device 20, and improving resource utilization.

Therefore, in embodiments described with reference to FIG. 2 to FIG. 6, the terminal device 20 sends, based on a to-be-transmitted state of the uplink service of the terminal device 20, suggestion information for activating or deactivating the at least one secondary cell to the network device 10. Therefore, the network device 10 adjusts or update activation or deactivation of the at least one secondary cell in a timely manner, to assist in data transmission at the terminal device 20. In this way, transmission efficiency at the terminal device 20 is ensured, and an excessively long delay is prevented. In this manner, the network device makes a decision based on information of both the network device and the terminal device. Factors considered are more comprehensive, accuracy of the decision is improved, and rational allocation of resources is implemented.

Figure 7:
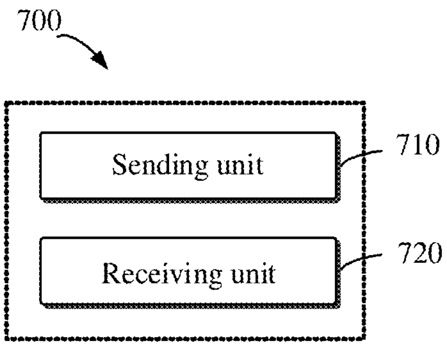
FIG. 7 is a schematic block diagram of a communication apparatus 700 according to at least one embodiment.

FIG. 7 is a schematic block diagram of a communication apparatus 700 according to at least one embodiment. The communication apparatus 700 is implemented as the terminal device or the chip in the terminal device 20. The scope of at least one embodiment is not limited in this aspect. The communication apparatus 700 is implemented as the terminal device 20 in the foregoing embodiments or a part of the terminal device 20.

As shown in the figure, the communication apparatus 700 includes a sending unit 710, configured to send suggestion information to the network device 10, where the suggestion information indicates a suggestion of the terminal device 20 for activating or deactivating the at least one secondary cell. The communication apparatus 700 further includes a receiving unit 720, configured to receive, from the network device 10, a configuration parameter for activating or deactivating the at least one secondary cell.

In some embodiments, the sending unit 710 is configured to send an RRC message to the network device 10, where the RRC message includes the suggestion information, and the RRC message is one of the following messages: an RRC connection resume complete message, an RRC setup complete message, an RRC reconfiguration complete message, an RRC recommendation message, or an AI assistance message.

In some embodiments, the suggestion information includes: timer duration information or timer adjustment amount information of a deactivation timer of the at least one secondary cell.

In some embodiments, the sending unit 710 is configured to send a MAC CE to the network device 10, where the MAC CE includes activation or deactivation suggestion information corresponding to the at least one secondary cell.

In some embodiments, the suggestion information further includes at least one of the following: effective time length information, probability information, target information, or reward information.

The communication apparatus 700 in FIG. 7 is configured to perform the processes implemented by the terminal device 20 in the foregoing embodiment with reference to FIG. 2. To avoid repetition, details are not described herein again.

Figure 8:
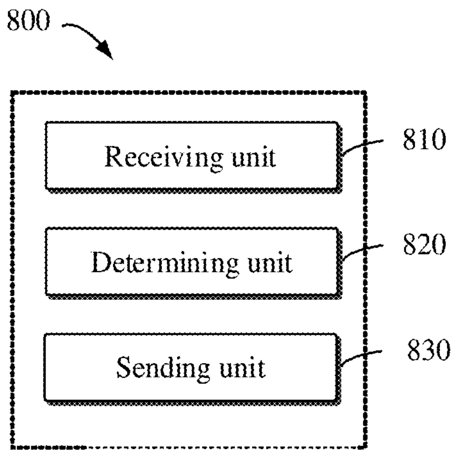
FIG. 8 is a schematic block diagram of a communication apparatus 800 according to at least one embodiment.

FIG. 8 is a schematic block diagram of a communication apparatus 800 according to at least one embodiment. The communication apparatus 800 is implemented as a network device 10 or a chip in the network device 10. The scope of at least one embodiment is not limited in this aspect. The communication apparatus 800 is implemented as the network device 10 in foregoing embodiments or a part of the network device 10.

As shown in the figure, the communication apparatus 800 includes a receiving unit 810, configured to receive suggestion information from a terminal device 20, where the suggestion information indicates a suggestion of the terminal device 20 for activating or deactivating at least one secondary cell. The communication apparatus 800 further includes a determining unit 820, configured to determine, based on the suggestion information, a configuration parameter for activating or deactivating the at least one secondary cell. The communication apparatus 800 further includes a sending unit 830, configured to send the configuration parameter to the terminal device 20.

In some embodiments, the receiving unit 810 is configured to receive an RRC message from the terminal device 20, where the RRC message includes suggestion information, and the RRC message is one of the following messages: an RRC connection resume complete message, an RRC setup complete message, an RRC reconfiguration complete message, an RRC recommendation message, or an AI assistance message.

In some embodiments, the suggestion information includes: timer duration information or timer adjustment amount information of a deactivation timer of the at least one secondary cell.

In some embodiments, the receiving unit 810 is configured to receive a MAC CE from the terminal device 20, where the MAC CE includes the suggestion information for activating or deactivating the at least one secondary cell.

In some embodiments, the determining unit 820 is configured to determine the configuration parameter based on the suggestion information and a load state of the network device 10.

In some embodiments, the suggestion information further includes at least one of the 20 following: effective time length information, probability information, target information, or reward information.

The communication apparatus 800 in FIG. 8 is configured to perform the processes implemented by the network device 10 in the foregoing embodiment with reference to FIG. 2. To avoid repetition, details are not described herein again.

Figure 9:
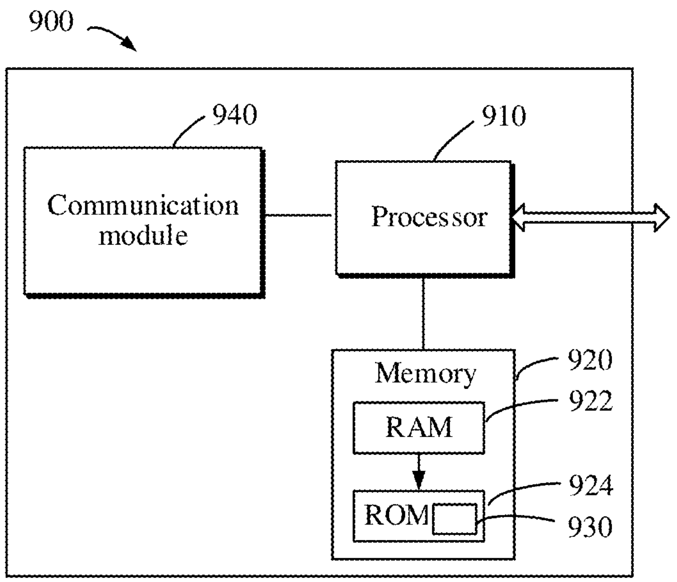
FIG. 9 is a simplified block diagram of an example device 900 according to at least one embodiment.

FIG. 9 is a simplified block diagram of an example device 900 according to at least one embodiment. The device 900 is configured to implement the terminal device 20 or the network device 10 shown in FIG. 1. As shown in the figure, the device 900 includes one or more processors 910, one or more memories 920 coupled to the processor 910, and a communication module 940 coupled to the processor 910.

The communication module 940 is configured for bidirectional communication. The communication module 940 has at least one communication interface for communication. The communication interface includes any interface to communicate with other devices.

The processor 910 is of any type suitable for a local technology network, and includes, but is not limited to, at least one of the following: one or more of a general-purpose computer, a dedicated computer, a microcontroller, a digital signal processor (DSP), or a controller-based multi-core controller architecture. The device 900 has a plurality of processors, such as an application-specific integrated circuit chip, which in time belongs to a clock synchronized with a main processor.

The memory 920 includes one or more non-volatile memories and one or more volatile memories. Examples of the non-volatile memory include, but are not limited to, at least one of the following: a read-only memory (ROM) 924, an erasable programmable read only memory (EPROM), a flash memory, a hard disk, a compact disc (CD), a digital versatile disc (DVD), or another magnetic storage and/or optical storage. Examples of the volatile memory include but are not limited to at least one of the following: random access memory (RAM) 922, or another volatile memory that does not persist for duration of a power failure.

The computer program 930 includes computer-executable instructions performed by the associative processor 910. The program 930 is stored in the ROM 924. The processor 910 performs any suitable actions and processes by loading the program 930 into the RAM 922.

Embodiments described herein are implemented by means of the program 930, so that the device 900 performs any of the processes discussed with reference to FIG. 2. Embodiments described herein alternatively are implemented by using hardware or by using a combination of software and hardware.

In some embodiments, the program 930 is tangibly included in the computer-readable medium, and the computer-readable medium is included in the device 900 (for example, in the memory 920) or another storage device that is accessed by the device 900. The program 930 is loaded from the computer-readable medium to RAM 922 for execution. The computer-readable medium includes any type of tangible non-volatile memory, for example, a ROM, an EPROM, a flash memory, a hard disk, a CD, or a DVD.

Generally, various embodiments described herein are implemented by hardware or a dedicated circuit, software, logic, or any combination thereof. Some aspects is implemented in hardware, while other aspects is implemented in firmware or software, which is performed by a controller, a microprocessor, or another computing device. While various aspects of embodiments described herein are shown and described as block diagrams, flowcharts, or represented by some other illustrations, the blocks, apparatuses, systems, techniques, or methods described herein is implemented as, for example, non-limiting examples, in hardware, software, firmware, a dedicated circuit or logic, general-purpose hardware or a controller or another computing device, or some combinations thereof.

At least one embodiment also provides at least one computer program product that is tangibly stored on a non-transitory computer-readable storage medium. The computer program product includes computer-executable instructions, for example, instructions included in the program module, which are performed in a device on a real or virtual processor of the target to perform the process/method as described above with reference to FIG. 2. Generally, the program modules include a routine, a program, a library, an object, a class, a component, a data structure, and the like that perform a specific task or implement a specific abstract data type. In various embodiments, the function of the program module is combined or split between the program modules as desired. The machine-executable instructions for the program module is performed locally or within a distributed device. In the distributed device, the program module is located in both local and remote storage media.

Computer program code for implementing the methods of at least one embodiment is written in one or more programming languages. The computer program code is provided to a general-purpose computer, a special-purpose computer, or a processor of another programmable data processing apparatus, so that in response to the program code being performed by the computer or another programmable data processing apparatus, a function/operation specified in the flowchart and/or block diagram is implemented. The program code is performed entirely on a computer, partly on a computer, as an independent software package, partly on a computer and partly on a remote computer, or entirely on a remote computer or server.

In the context of at least one embodiment, the computer program code or related data is carried by any appropriate carrier to enable a device, apparatus, or processor to perform the various processes and operations described above. Examples of carriers include signals, computer-readable medium, and the like. Examples of the signals includes electrical, optical, radio, acoustic, or other forms of propagation signals, for example, carrier waves, or infrared signals.

The computer-readable medium is any tangible medium that includes or stores programs for or with respect to an instruction execution system, an apparatus, or a device. The computer-readable medium is a computer-readable signal medium or a computer-readable storage medium. The computer-readable medium includes, but is not limited to, an electrical, magnetic, optical, electromagnetic, infrared, or semiconductor system, apparatus or device, or any suitable combination thereof. A more detailed example of the computer-readable storage media includes an electrical connection with one or more wires, a portable computer disk, a hard disk, a random access memory (RAM), a read-only memory (ROM), an erasable programmable read-only memory (EPROM or flash memory), an optical storage device, a magnetic storage device, or any suitable combination thereof.

In addition, although the operations of the methods in at least one embodiment are described in a specific order in the accompanying drawings, the operations are capable of being performed in any order, or that all of the operations shown have to be performed to achieve an expected result. Instead, the steps depicted in the flowchart changes the execution sequence. Additionally or alternatively, certain steps is omitted, a plurality of steps is combined into one step for execution, and/or one step is decomposed into a plurality of steps for execution. Features and functions of two or more apparatuses according to at least one embodiment are embodied in one apparatus. Conversely, the features and functions of one apparatus described above is further divided into embodiments of a plurality of apparatuses.

Implementations of embodiments described herein have been described above, and the foregoing description is exemplary but not exhaustive, and is not limited to the implementations disclosed. Many modifications and changes will be apparent to those of ordinary skill in the art without departing from the scope and spirit of the various implementations illustrated. Terms used herein are selected to well explain principles, actual applications, or improvements to technologies in the market of each implementation, or to enable another person of ordinary skill in the art to understand each implementation disclosed in embodiments described herein.

What is claimed is:

1. A communication method, comprising:

determining, by a terminal device, a service state of to-be-transmit data;

determining whether at least one secondary cell is activated or deactivated;

generating suggestion information based on the determined service state of the to-be-transmitted data and whether the at least one secondary cell is activated or deactivated;

sending, by the terminal device, the suggestion information to a network device, wherein the suggestion information is usable to indicate a suggestion of the terminal device for activating or deactivating the at least one secondary cell based on whether the activation or deactivation of the at least one secondary cell meets the service state;

receiving, by the terminal device from the network device, a configuration parameter for activating or deactivating the at least one secondary cell based on the suggestion information; and updating a status of the at least one secondary cell.

2. The communication method according to claim 1, wherein the step of sending by the terminal device includes:

sending, by the terminal device, a radio resource control (RRC) message to the network device, wherein the RRC message includes the suggestion information, and the RRC message is one of the following messages: an RRC connection resume complete message, an RRC setup complete message, an RRC reconfiguration complete message, or an RRC recommendation message.

3. The communication method according to claim 2, wherein the sending the RRC message that includes the suggestion information includes: sending the RRC message that includes timer duration information or timer adjustment amount information of a deactivation timer of the at least one secondary cell.

4. The communication method according to claim 1, wherein the step of sending by the terminal device includes:

sending, by the terminal device, a medium access control (MAC) control element (CE) to the network device, wherein the MAC CE includes the suggestion information for activating or deactivating the at least one secondary cell.

5. The communication method according to claim 2, wherein the sending the RRC message that includes the suggestion information further includes sending the RRC message that includes:

effective time length information, probability information, target information, or reward information.

6. A communication method, comprising:

receiving, by a network device, suggestion information from a terminal device, wherein the suggestion information is suggestion information generated by the terminal device based on a determined service state of to-be-transmitted data and whether at least one secondary cell is activated or deactivated, wherein the suggestion information is configured for activating or deactivating at least one secondary cell to meet a service state of to-be-transmitted data by the terminal device;

determining, by the network device based on the suggestion information, a configuration parameter for activating or deactivating the at least one secondary cell based on the suggestion information;

sending, by the network device, the configuration parameter to the terminal device, the configuration parameter usable to indicate activation or deactivation of the at least one secondary cell; and updating a status of the at least one secondary cell.

7. The communication method according to claim 6, wherein the step of receiving by the network device includes:

receiving, by the network device, a radio resource control (RRC) message from the terminal device, wherein the RRC message includes the suggestion information, and the RRC message is one of the following messages: an RRC connection resume complete message, an RRC setup complete message, an RRC reconfiguration complete message, or an RRC recommendation message.

8. The communication method according to claim 7, wherein the receiving the RRC message that includes the suggestion information includes receiving the RRC message that includes: timer duration information or timer adjustment amount information of a deactivation timer of the at least one secondary cell.

9. The communication method according to claim 6, wherein the step of receiving by the network device includes:

receiving, by the network device, a medium access control (MAC) control element (CE) from the terminal device, wherein the MAC CE includes the suggestion information for activating or deactivating the at least one secondary cell.

10. The communication method according to claim 6, wherein the step of determining by the network device includes:

determining, by the network device, the configuration parameter based on the suggestion information and a load state of the network device.

11. The communication method according to claim 7, wherein the receiving the RRC message that includes the suggestion information further includes receiving the RRC message that includes:

effective time length information, probability information, target information, or reward information.

12. An apparatus, comprising:

a processor and a memory, wherein the memory is coupled to the processor and stores instructions for execution by the processor, and the processor executes the instructions to cause the processor to perform operations including:

determining a service state of to-be-transmit data;

determining whether at least one secondary cell is activated or deactivated;

generating suggestion information based on the determined service state of the to-be-transmitted data and whether the at least one secondary cell is activated or deactivated;

sending the suggestion information to a network device, wherein the suggestion information is usable to indicate a suggestion for activating or deactivating the at least one secondary cell based on whether the activation or deactivation of the at least one secondary cell meets the service state;

receiving from the network device, a configuration parameter for activating or deactivating the at least one secondary cell based on the suggestion information; and updating a status of the at least one secondary cell.

13. The apparatus according to claim 12, wherein the processor is further configured to send the suggestion information by:

sending a radio resource control (RRC) message to the network device, wherein the RRC message includes the suggestion information, and the RRC message is one of the following messages: an RRC connection resume complete message, an RRC setup complete message, an RRC reconfiguration complete message, or an RRC recommendation message.

14. The apparatus according to claim 12, wherein the suggestion information includes: timer duration information or timer adjustment amount information of a deactivation timer of the at least one secondary cell.

15. The apparatus according to claim 12, wherein the processor is further configured to send the suggestion information by:

sending a medium access control (MAC) control element (CE) to the network device, wherein the MAC CE includes the suggestion information for activating or deactivating the at least one secondary cell.

16. The apparatus according to claim 12, wherein the suggestion information further includes:

effective time length information,
probability information,
target information, or
reward information.

* * * * *